United States Patent [19]

Larson et al.

[11] Patent Number: 5,244,284
[45] Date of Patent: Sep. 14, 1993

[54] ANTIFRICTION ROLLER MEANS FOR PLUNGERS

[75] Inventors: John K. Larson, Arlington Heights; Talmage O. Green, Schaumburg, both of Ill.

[73] Assignee: Precision Instruments, Inc., DesPlaines, Ill.

[21] Appl. No.: 796,374

[22] Filed: Nov. 22, 1991

[51] Int. Cl.$^5$ ............................................. F16C 29/04
[52] U.S. Cl. .................................................. 384/58
[58] Field of Search .................... 384/58, 29, 31, 30, 384/32

[56] References Cited

U.S. PATENT DOCUMENTS 4,485,728 12/1984 Bando .................................. 384/29
4,938,610 7/1990 Kato ..................................... 384/58

Primary Examiner—Lenard A. Footland
Attorney, Agent, or Firm—Hill, Steadman & Simpson

[57] ABSTRACT

A plunger has a perimeter for spaced cooperation with a guide bore along a reciprocation axis. For alleviating lateral thrust friction between the plunger perimeter and guide bore, antifriction roller structure has an axle with journals engaged in radius bearings on axis transverse to the reciprocation axis of the plunger. Mounting of the antifriction roller structure is such that annular wheel surfaces on the roller effect rolling engagement with the guide bore.

20 Claims, 1 Drawing Sheet

ANTIFRICTION ROLLER MEANS FOR PLUNGERS

BACKGROUND OF THE INVENTION

The present invention relates to improvements in antifriction means for plungers, and is more particularly concerned with a new and improved antifriction roller means, especially useful for reciprocatable plungers which are subject to transverse thrust in operation.

In some reciprocatable plunger equipped apparatus, the plunger is frequently, and in some instances regularly subjected to transverse thrust which causes localized friction between the plunger perimeter and the wall surface of the housing or guide bore in which the plunger is caused to reciprocate. This friction is especially bothersome when performance testing the tool. It is to the alleviation of such friction that the present invention is directed.

An example of a typical apparatus in which the lateral or transverse friction-prone thrust of a plunger is experienced in the operation of the apparatus, is torque control mechanism for wrenches, and the like. An example is disclosed in the copending application of the present applicants, Ser. No. 713,381 filed Jun. 10, 1991, now U.S. Pat. No. 5,129,293 issued Aug. 14, 1992, and the disclosure of which is incorporated herein by reference for whatever help it may be to a thorough understanding of the disclosure herein, and to reduce to a comfortable minimum disclosure detail necessary for exemplifying a best mode representation of the present invention.

Heretofore, alleviation of lateral thrust friction in respect to the plungers of torque control mechanism for wrenches has been addressed by providing ball bearings about the perimeter of the plunger of the mechanism as disclosed in U.S. Pat. No. 3,270,594. While that arrangement provides some improvement due to the smooth surface, it still does not attain sufficient friction alleviation to attain the best test results for that class of instruments. Because of the necessary frictional engagement of the ball bearings in their races direct rubbing exists and only about 80% antifriction results are obtainable within textbook friction parameters, and which may even drop below that level if there is inadequate attention to lubrication.

SUMMARY OF THE PRESENT INVENTION

An important object of the present invention is to provide a new and improved antifriction means for plungers which are subject to transverse thrust during reciprocating operation.

Another object of the invention is to provide a structure as just set forth in which the antifriction means for the plunger comprises a new and improved roller means.

Another object of the invention is to provide a new and improved simple, easy to assemble, relatively inexpensive, highly efficient antifriction means for use on reciprocating plungers subject to transverse thrust likely to result in objectionable friction.

Pursuant to the present invention, there is provided a plunger having perimeter means for cooperating with a guide bore of predetermined diameter along a reciprocation axis, and means for alleviating lateral thrust friction between such perimeter and the bore, and comprising antifriction roller structure having axle means, radius bearing means on the plunger on a bearing axis transverse to the reciprocation axis, the axle means being journaled in the bearing means, and the roller structure having wheeling surface means for rolling engagement with the guide bore.

Further, pursuant to the present invention, the construction just set forth is especially useful in respect to the plungers of torque control mechanism for wrenches and the like, wherein there is a component of reciprocation of the plungers during which transverse thrust force is imposed on the plunger.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which.

DETAILED DESCRIPTION

Figure 1:
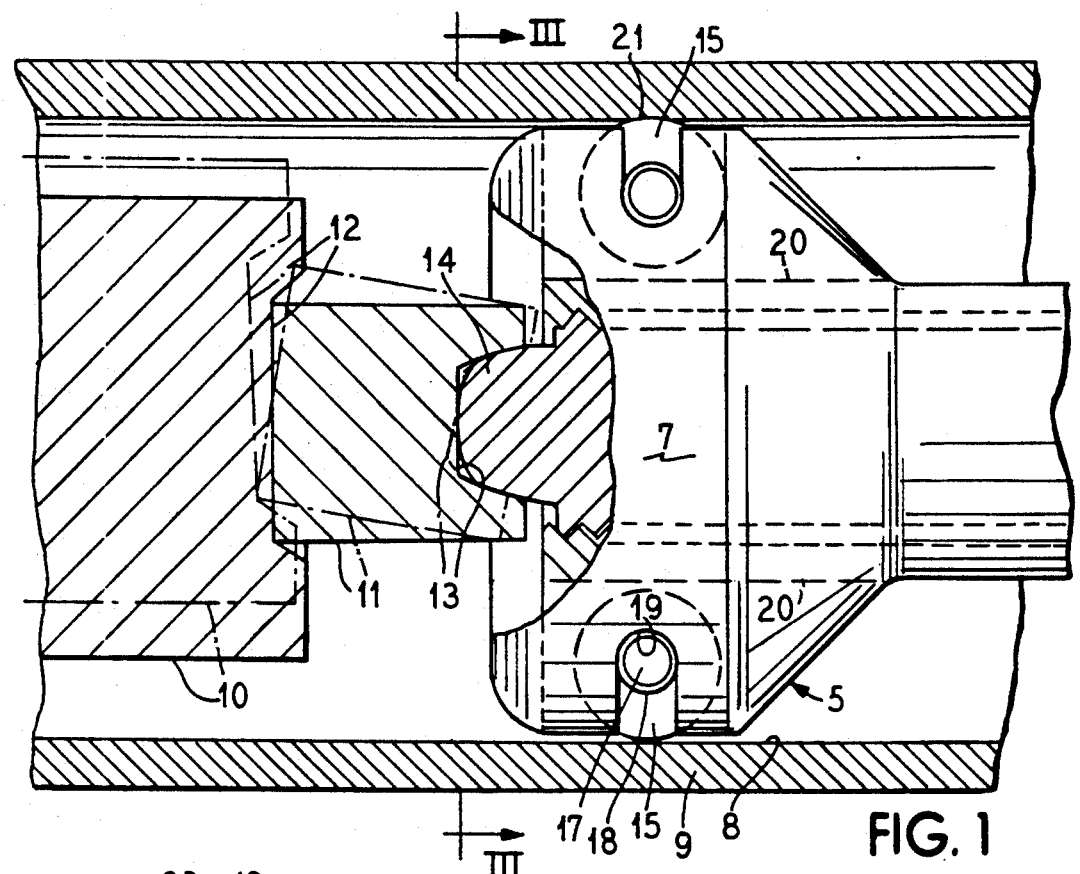
FIG. 1 is a fragmental elevational view, partially in section, showing a plunger structure embodying the present invention.
Figure 2:
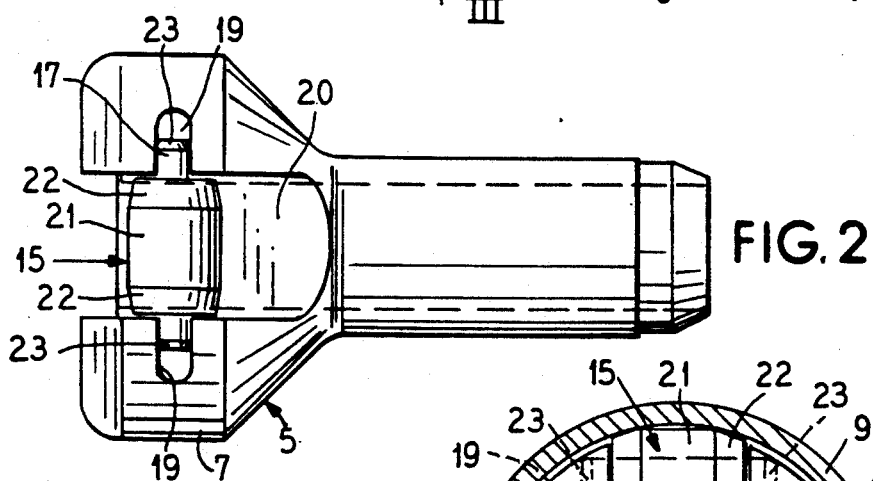
FIG. 2 is a view similar to FIG. 1, but rotated 90° about the plunger reciprocation axis relative to the position in FIG. 1.

As shown in the drawings, a plunger 5 embodying the present invention is disclosed as an essential part of the torque wrench control mechanism with which the hereinbefore described copending application Ser. No. 713,381 is concerned. The plunger 5 has perimeter means 7 for cooperating in complementary clearance relation with a guide bore 8 within a tubular housing 9 and along a reciprocation axis longitudinally of the housing. In use, the plunger 5 is biased toward the end of a rod-like force transmission member 10. A substantially rectangularly shaped pivot block 11 has one end pivotally engaged in a centering groove 12 in the adjacent end of the transmission member 10. At its opposite end, the pivot block 11 has a ball socket 13 within which is engaged a pivot controlling ball 14 that projects from the plunger 5. When wrenching torque is applied with the tool, rocking of the block 11 occurs substantially as indicated in dot-dash outline in FIG. 1, and there is a component of reciprocating movement of the plunger 5 with a concurrent transverse thrust of the perimeter 7 toward the wall surface defined by the bore 8. When the force transmission member 10 swings in one diametrical direction, a component of transverse force is applied to the plunger 5 in that direction; and when the member 10 swings in the opposite diametrioal direction, the plunger 5 is thrust with a component of transverse force in this direction. In the absence of friction alleviating means, the plunger perimeter 7 directly frictionally engages the bore 8 when these transverse components of force are applied. During testing of the tool, such direct frictional engagement tends to interfere with accurate test results.

According to the present invention, new and improved means for alleviating lateral thrust friction between the perimeter 7 and the bore 8 are provided, comprising as a major component antifriction roller structure in the form of a respective roller 15 located at each of the diametrically opposite sides of the plunger 15 subject to transverse thrust toward the bore 8 in the use of the mechanism. Each of one piece of the rollers 15 is constructed of wear-resistant material, such as hardened steel.

Axle means of substantially smaller diameter than the roller 15 comprises a simple hardened material shaft 17 which extends in preferably freely rotatable fashion through an axial bore 18 in the associated roller 15. Opposite ends of the axle shaft 17 in each instance project as journals beyond the ends of the associated roller and are engaged in complementary radius bearing means 19 in the plunger on axis transverse to the reciprocation axis of the plunger. The radius bearing means 19 for each of the axles comprises a respective complementary radius bottom secant slot or groove in the perimeter of the plunger, with the two grooves 19 being parallel to one another. For endwise control accommodation of the rollers 15, the plunger 5 has respective clearance and control notches 20 in its perimeter intersecting the bearing grooves 15 and extending parallel to the reciprocation axis of the plunger. Through this arrangement, the roller/axle assembly can be conveniently assembled in each of the groove 19 and notch 20 configurations.

The cooperative dimensions of the antifriction rollers 15, the axles 17, the bearing means grooves 19 and the clearance and control notches 20 in the assembly is such that the perimeters of the rollers 15 project sufficiently beyond the plunger perimeter 7 to be in free wheeling cooperation with the wall of the guide bore 8. For stability, the rollers 15 are of a length to provide a substantial length perimeter 21 having narrow oblique opposite end annular anti-friction running or wheeling surfaces 22 for limited running engagement with the wall of the housing bore 8. As shown, (FIG. 3) substantial length portions of the perimeters 21, between the narrower wheeling surfaces 22, are of a diameter advantageously free from contact with the housing bore 8. Desirably, wheeling surfaces 22 are formed on a radius complementary to the bore wall radius.

Figure 3:
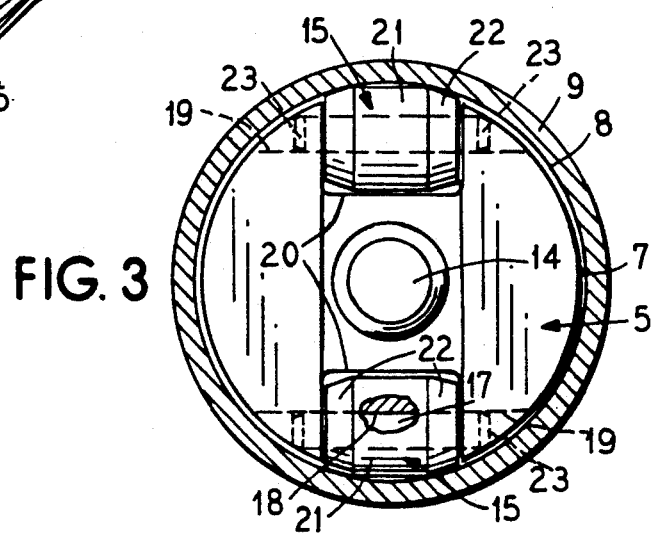
FIG. 3 is a sectional elevational detail view taken substantially along the line III—III in FIG. 2.

Each of the axle shafts 17 has opposite rounded off or chamfered journal ends 23 which project equally from the ends of the associated roller 15, adjacent to the plunger perimeter 7 but generally free from engaging the wall of the bore 8 and presenting minimal frictional contact with the bore should the shaft drift from the free relation, as shown in FIG. 3.

By having the axle journal projections of the shafts 17 as small in diameter as practicable, e.g. about half the diameter of the rollers 15, and within the bending stress resisting parameters which must be accommodated in the mechanism, the coefficient of bearing friction is maintained advantageously low, and the roller diameter is of advantageously larger diameter for efficient rolling and thrust engagement with the bore wall surface. Also, by having the roller perimeters 21 substantially cylindrical and the narrow annular tapered wheeling surfaces 22 on a complementary radius to the bore 8, there is advantageous spaced minimal riding contact of the rollers with the bore wall surface. Calculations according to the formulae for rolling friction as defined in Machinery's Handbook, 22nd Edition, indicate attainment of an antifriction efficiency of about 95% by the present invention.

It will be apparent that various modifications and/or additions may be made in the apparatus of the invention without departing from the essential feature of novelty involved, which are intended to be defined and secured by the appended claims.

I claim:

1. A plunger having perimeter means for cooperating with a guide bore of predetermined diameter along a reciprocation axis, and having:
    means for alleviating lateral thrust friction between said perimeter and said bore and comprising an elongated one piece antifriction roller structure having axle means;
    radius bearing means on the plunger in a bearing axis transverse to said reciprocation axis;
    said axle means being journaled in said bearing means; and
    said roller structure having a roller perimeter provided with spaced limited narrow opposite end anti-friction wheeling surfaces for rolling engagement with said guide bore, and substantial length portion of said roller perimeter between said wheeling surfaces being of a diameter which remains free from engagement with said guide bore when said wheeling surfaces are in rolling engagement with said bore, so that frictional contact between said roller perimeter and said bore is substantially minimized.

2. A plunger according to claim 1, wherein said axle means and said radius bearing means have a diameter about one-half the diameter of said antifriction roller structure, and said radius bearing means being in secant groove means in said plunger perimeter.

3. A plunger according to claim 1, wherein said axle means comprises a shaft having opposite journal end portions engageable with said radius bearing means, and said axle shaft extends freely rotatably through a bore in said roller structure.

4. A plunger according to claim 1, wherein said radius bearing means is in secant groove means in said plunger perimeter.

5. A plunger according to claim 4, wherein opposite ends of said axle means normally extend short of the ends of said secant groove means, and said opposite ends are rounded to minimize contact with the bore if the axle ends drift toward contact with the bore.

6. A plunger according to claim 1, wherein said plunger perimeter means has clearance and control notch means extending parallel to said axis and intersecting said radius bearing means for accommodating said roller structure and axle means for easy assembly.

7. A plunger according to claim 1, wherein said plunger perimeter means has duplicate diametrically opposite roller structure-accommodating clearances and radius bearing means for diametrically opposite respective duplicate roller structures.

8. A plunger according to claim 1, wherein said wheeling surfaces have transverse radius of curvature complementary to said bore diameter.

9. In combination in a plunger having a perimeter cooperating with a guide bore along a reciprocation axis, and having
    means for alleviating lateral thrust friction between said perimeter and said bore and comprising antifriction roller structure having perimeter means and axle means;
    bearing means on the plunger comprising secant groove means in said plunger perimeter means on a bearing axis transverse to said reciprocation axis for receiving said axle means and cooperating with a roller receiving notch in said plunger perimeter means intersecting said secant groove means; and said secant groove means and axle means and said notch cooperating for controlling said roller structure for rolling engagement with said guide bore.

10. A combination according to claim 9, wherein said roller structure has axially spaced annular wheeling surfaces running along said guide bore.

11. A combination according to claim 9, wherein said antifriction roller structure perimeter means comprises narrow spaced annular wheeling surfaces engaging said bore and a substantially wider area of said perimeter means remaining free from contact with said bore.

12. A combination according to claim 9, wherein said axle means comprises a shaft having opposite journal end portions, and said bearing means comprises said secant groove means in said plunger perimeter, and providing bearing surface means complementary to said journal end portions.

13. A combination according to claim 9 wherein said axle means provides journals of a diameter about one-half the diameter of said antifriction roller structure and shorter than said secant groove means.

14. A combination according to claim 13, wherein said roller structure has an axle bore and said axle means comprises a shaft extending through said bore and providing said journals.

15. A combination according to claim 14, wherein respective ends of said journals are rounded to minimize frictional contact with said bore if said shaft drifts toward contact of said ends with said bore.

16. A combination according to claim 9, wherein said plunger has a perimeter, and a duplicate diametrically opposite roller structures each of which has running perimeter means for engaging said bore.

17. In combination in a plunger having perimeter means for cooperating with a guide bore along a reciprocation axis, and having means for alleviating lateral thrust friction between said perimeter means and said bore, and comprising an elongate one piece antifriction roller having a perimeter and axle means;

bearing means on the plunger on an axis transverse to said reciprocation axis for receiving said axle means and supporting said roller structure;

narrow annular spaced perimeter wheeling surfaces projecting from said perimeter for riding along said bore; and said roller perimeter having a substantial portion thereof between said wheeling surfaces remaining free from contact with said bore, so that frictional contact between said bore and said roller is minimized.

18. A combination according to claim 17, wherein said spaced annular wheeling surfaces complement the contour of said bore.

19. A combination according to claim 17, wherein said axle means comprises an axle shaft received freely slidably through an axle bore in said roller, and said axle shaft has journal portions extending from opposite ends of said bore.

20. A combination according to claim 19, wherein said journal portions are about half the diameter of said roller means.

* * * * *